Sept. 29, 1964        L. A. BIXBY              3,150,532
                      DRIVE AXLES Original Filed Oct. 18, 1957            4 Sheets-Sheet 1

INVENTOR
Leo A. Bixby

BY Strauch, Nolan & Neale
ATTORNEYS

Sept. 29, 1964  L. A. BIXBY  3,150,532
DRIVE AXLES
Original Filed Oct. 18, 1957  4 Sheets-Sheet 2
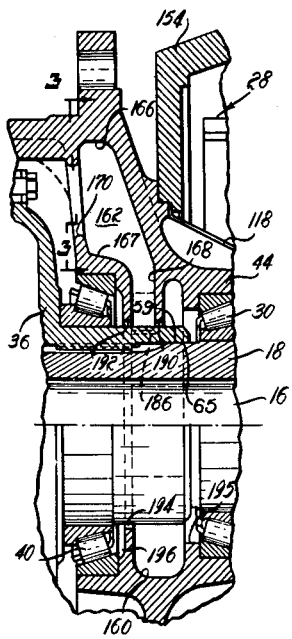
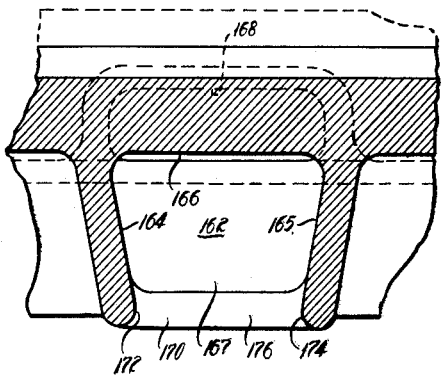
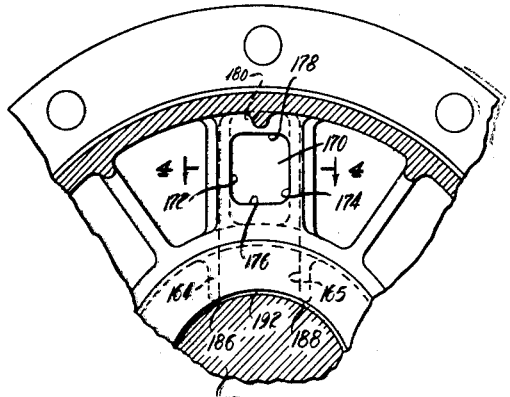
INVENTOR
Leo A. Bixby
BY Strauch, Nolan & Neale
ATTORNEYS Sept. 29, 1964 L. A. BIXBY 3,150,532
DRIVE AXLES
Original Filed Oct. 18, 1957 4 Sheets-Sheet 3

INVENTOR
Leo A. Bixby
BY Strouch, Nolan & Neale
ATTORNEYS

Sept. 29, 1964         L. A. BIXBY                3,150,532
                       DRIVE AXLES
Original Filed Oct. 18, 1957                4 Sheets-Sheet 4

INVENTOR
Leo A Bixby
BY Strauch, Nolan & Neale
ATTORNEYS

United States Patent Office 3,150,532
Patented Sept. 29, 1964

3,150,532
DRIVE AXLES
Leo A. Bixby, Niles, Mich., assignor to Rockwell-Standard Corporation, Coraopolis, Pa., a corporation of Pennsylvania
Continuation of application Ser. No. 691,101, Oct. 18, 1957. This application Aug. 23, 1961, Ser. No. 133,724
15 Claims. (Cl. 74—391)

This invention relates to improvements in vehicle drive axles and particularly to improvements in planetary gear drive axle outer end constructions.

This is a continuation of my copending application Serial No. 691,101 filed October 18, 1957, now abandoned, which in turn is a continuation-in-part of my application Serial No. 625,095 filed November 29, 1956 and since abandoned.

An important feature of the invention is the provision of radial float for the internal ring gear of the planetary gearing at the outer end of the axle assembly. While it has been heretofore proposed to mount internal ring gears for radial float in conventional coaxial planetary drive transmissions which were supported by stationary bearing mounts or in ship propulsion drives, such has hitherto not been considered possible in planetary axle outer end drives to ground engaging vehicle wheels which undergo considerable uncontroled shock and strain during actual operation. Hence prior to the invention all ring gears in planetary axle outer ends were radially rigid or even integral with their mounting on the axle housing or spindle. In spite of this deep seated practice in the vehicle art, applicant has deliberately provided radial float in the internal ring gear of the planetary axle outer end, and in actual practice this structure has not only proved possible, but it has resulted in unexpectedly longer drive life because of the reduced planetary gear tooth wear arising from the fact that even under sudden shock and strains encountered in roadway operation the floating ring gear of the invention correspondingly chords and triangulates to always maintain full tooth contact with the pinions regardless of load and changes in load. This eliminates tooth breakage and objectionable end loading on the planetary pinions, and provides maximum gear life at full efficiency.

As will appear this novel feature of radial float of the ring gear has further special advantage when used with a radially floatintg sun gear, and further advantages are gined by its incorporation with a special saddle mount for the ring gear mounting member hub on the axle housing.

A further very important object of the invention is to provide a novel planetary axle outer end assembly driving a ground engaging wheel of a vehicle wherein the ring gear of the planetary gear assembly is mounted for radial float on an axle supported structure.

It is a further object of the invention to provide a novel planetary axle outer end assembly driving a ground engaging wheel of a vehicle wherein both the sun gear and the ring gear of the planetary gear assembly are independently mounted for limited radial float, the ring gear being carried by the axle housing and the sun gear rotating with the drive shaft.

Another object is to provide an internal planetary ring gear and hub mount of such construction that the ring gear is axially confined without radial restraint whereby resilient deformation of the ring gear under pinion loading will be uniform across the axial dimensions of the ring gear.

A further object of the invention is to provide a novel drive axle wherein the ring gear of the planetary gear assembly at each end of the axle is mounted for limited radial float on a support which has a hub provided with a spline connection to the axle housing structure and having a saddle bearing mounting on accurately formed concentric surfaces on opposite ends of the spline connection, for optimum alignment and elimination of wear.

Further objects of the present invention will become apparent from the following description, when considered in connection with the accompanying drawings and the appended claims.

In the drawings which illustrate two simple and practical embodiments of the invention:

FIGURE 2 is an enlarged fragmentary detail view of the wheel bearing portion of an axle end;

FIGURE 3 is a fragmentary sectional view along the line 3—3 of FIGURE 2 illustrating oil opening and channel detail for supplying oil to the wheel bearings;

FIGURE 4 is a fragmentary sectional view taken along line 4—4 of FIGURE 3 illustrating oil channel detail;

Figure 1:
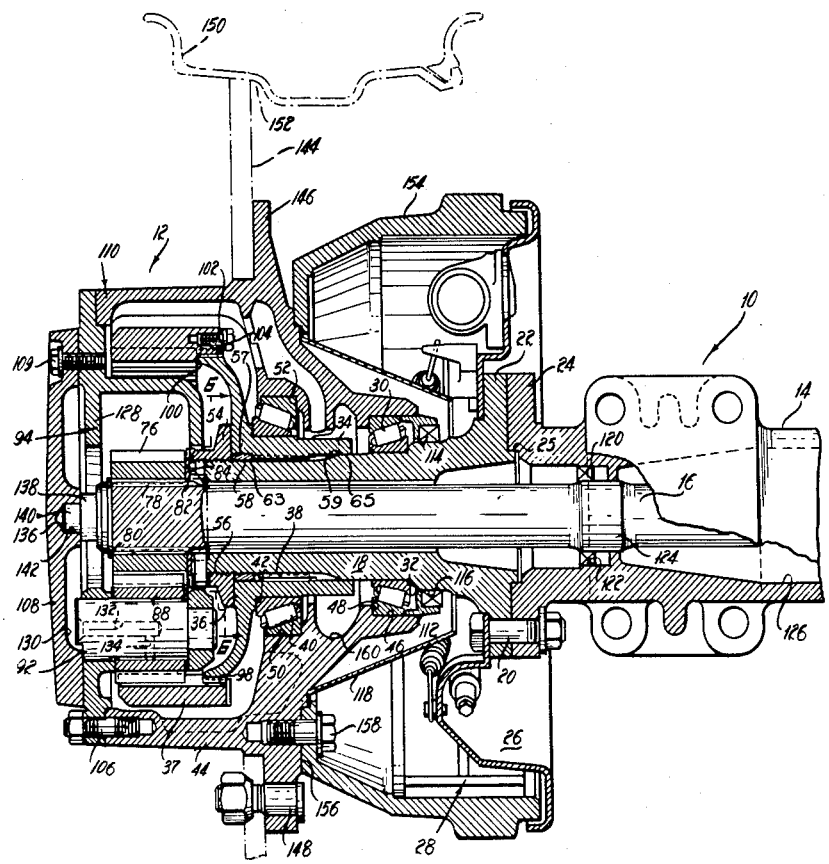
FIGURE 1 is a fragmentary partially sectioned top view of a non-dirigible drive axle with planetary gear outer ends embodying the principles of the present invention.

With reference to the drawings and particularly to FIGURE 1, rear axle 10 is equipped at each end with a planetary gear outer end assembly 12 and has an axle housing 14 containing a differential connected rotatable axle shaft 16. An axially outwardly extending hollow spindle 18 is fixed to the end of axle housing 14 in surrounding relation to shaft 16 by suitably circumferentially spaced bolt assemblies 20 rigidly connecting mating flanges 22 and 24 on spindle 18 and housing 14 and which are piloted in concentric alignment at 25. A brake backing plate 26 for brake assembly 28 is secured to spindle flange 22 by bolts 20. Spindle 18 supports the inboard wheel bearing 30, its inner race being in axial abutment with spindle shoulder 32.

The hub 34 of mounting member 36 for planetary ring gear 37 is internally splined at 38 to spindle 18 and supports the outboard wheel bearing 40 with its inner race in abutment with shoulder 42 thereof. Opposed tapered roller type antifriction bearings 30 and 40 journal the wheel hub 44, bearing 30 being received in end bore 46 of hub 44 with its outer race in abutment with shoulder 48 and bearing 40 being received in the opposite end bore 50 of hub 44 with its outer race in abutment with shoulder 52. A nut 54 which is threaded at 56 on the outer end of spindle 18 may be manipulated to adjust the preloading of wheel bearings 30 and 40 and holds the ring gear support member 36 in axially fixed relation on spindle 18. An annular cylindrical bushing spacer 58 of hard metal is received within the end of the bore of the hub of member 36 between the end of its internal splines 38 and the adjacent face of nut 54 in surrounding relation to spindle 18 to maintain a fixed concentricity between member 36 and spindle 18, and spacer 58 fits snugly upon cylindrical surface 63 of spindle 18.

The ring gear mounting hub 34 has axially spaced concentric cylindrical surfaces 57 and 59 at opposite ends of the spline section, and surfaces 57 and 59 rest respectively on the concentric outer surface of spacer 58 and cylindrical surface 65 formed on the spindle. The mounting surfaces 57, 59, 63 and 65 are accurately formed, preferably being concentrically ground, so that they perfectly and accurately interfit with a smooth substantially snug relation and therefore provide a saddle mount of hub 34 which insures that there are no bending forces due to ring gear action exerted on the splined connection 38 which therefore separately absorbs and transmits the torsional stresses from the ring gear to the axle housing. This results in longer spline life and more dependable operation.

Figure 5:
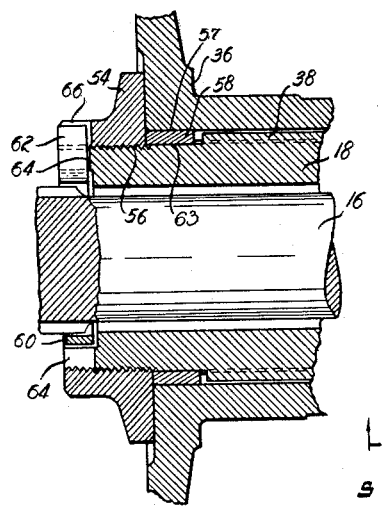
FIGURE 5 is a fragmentary diametral sectional view taken along the line 5—5 of FIGURE 6 and illustrating a nut threaded to the end of an axle housing spindle extension and nut locking means.
Figure 6:
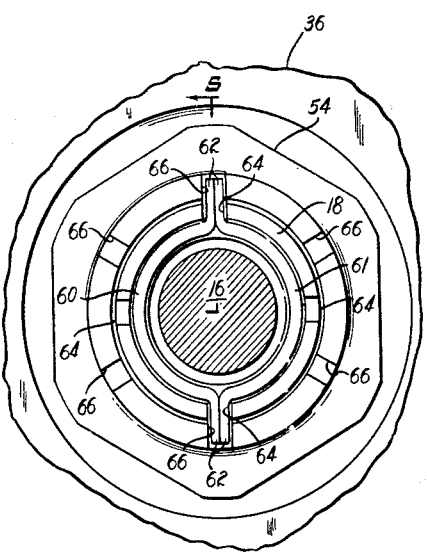
FIGURE 6 is a sectional end view of the nut and nut locking means taken along the line 6—6 of FIGURE 1.

Referring also to FIGURES 5 and 6, nut 54 is locked against rotation in its adjusted position on threads 56 of spindle 18 by two semi-circular stampings 60 and 61 each of which is formed with an arcuate portion terminating in radially extending flanged ends 62 which project radially through diametrically opposed radial slots 64 in the end face of spindle 18 and through aligned radially extending slots 66 in the end face of the integral hub of nut 54. The end face of nut 54 has three diametrically opposed equiangularly spaced pairs of slots 66 and the end face of spindle 18 has two equiangularly spaced pairs of diametrically opposed slots 64. This combination of slots 64 and 66 give twelve possible locked settings for each 360° of rotation of nut 54 which is satisfactory for bearing adjustment.

Figure 7:
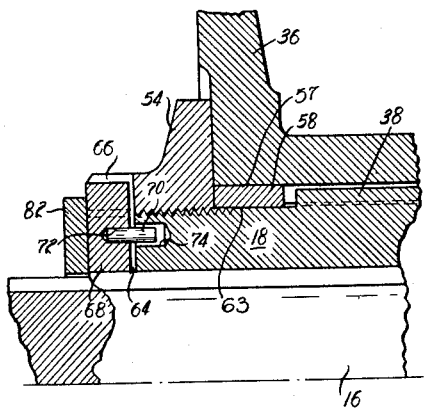
FIGURE 7 is a fragmentary sectional view similar to FIGURE 5 illustrating another nut locking means constituting a second embodiment of this aspect of the invention.

An alternative locking means is illustrated in FIGURE 7. In this alternative construction a pair of individual rectangular locking blocks 68 are inserted in the diametrically opposed pairs of radially aligned slots 64 and 66 in spindle 18 and nut 54. A pin 70, press-fitted into block opening 72 of each locking block 68, extends in a loose fit in an opening 74 in the bottom of the spindle slot 64 to restrain block 68 radially and circumferentially in position while permitting enough play to assure an equal take up between the sides of a block 68 and the respective slots 64 and 66. Blocks 68 are axially confined in slots 64 and 66 by an annular retainer washer 82 on shaft 16 adjacent the end faces of spindle 18 and nut 54.

Referring again to FIGURE 1, a planetary sun gear 76 is splined at 78 to the outer end of axle shaft 16 and is axially restrained in position thereon by snap ring 80 and by washer 82. The sun gear 76 is mounted for radial float in the assembly. Rotation of washer 82 is prevented by a pin 84 which is riveted to the washer 82 and which projects into one of the slots 64 in the end of spindle 18. Sun gear 76 meshes with three equiangularly disposed planetary pinions 88 which are journalled on pins 92 extending between and fixed to the opposed walls of planetary pinion carrier 94. Planetary pinions 88 mesh with internal ring gear 37 which is splined at 98 to mount member 36. The spline connection at 98 permits a limited radial float of the ring gear. Ring gear 37 is held axially in place on member 36 between the radial shoulder defined by the end faces 100 of the gear teeth and plate 102 held in place on the end of ring gear 37 by bolts 104.

In operation, when planetary pinions 88 load ring gear 37, the splines 98 permit slight resilient deformation of gear 37 from its normal circular shape toward an arcuate triangulated shape rather than to bell mouth ring gear 37 as would be the case if gear 37 were formed integral with mount member 36.

The above described construction wherein the ring gear 37 is mounted for radial float provides an efficiently operating mechanism wherein the ring gear by virtue of its spline connection to member 36 transmits only torsional stresses to the mounting member 36 which in turn by virtue of the special saddle mount and spline connection transmits essentially only torsional stresses through splines 38 to the axle housing. Under drive stress the floating ring gear is free to deform to conform to localized planetary pinion forces, and this combined with the floating sun gear in the assembly results in equalized distribution of stresses to all gears of the planetary system and produces long trouble-free gear life and quiet operation.

Carrier 94 is fastened to wheel hub member 44 by stud and nut assemblies 106 and forms an apertured end plate which is closed by hub end plate 108 and bolts 109 to provide with wheel hub member 44 a completely enclosed housing 110 for the axle outer end planetary gearing and wheel support bearings 30 and 40. A die cast oil seat retainer 112, which is press fitted into opening 46 of wheel hub 44 and an oil seal 114 which is retained thereby and which is in annular contact with surface 116 of spindle 18, effectively precludes loss of oil from housing 110 along the exterior of spindle 18 into brake assembly 28. A frusto-conical shield 118 is mounted on wheel hub 44 in surrounding relation thereto and to seal 114 to intercept any oil that may seep past oil seal 114 and this prevents contamination of brake assembly 28. Any oil accumulating on the interior of shield 118 will be carried by centrifugal force away from brake 28. Other oil seal constructions may be used in place of retainer 112 and oil seal 114. An oil seal 120 mounted in opening 122 of axle housing 14 is in annular sealing contact with surface 124 of axle shaft 16 to limit loss of oil from housing 110 into axle housing space 126.

The apertured outer wall 128 of pinion carrier 94 coacts with hub plate 108 to form an annular pocket 130 which collects oil from the planetary gearing 12. Communicating openings 132 and 134 are provided in each planetary gear pin 92 to permit flow of lubricating oil to the bearing surfaces of planetary pinions 88 on the pins 92 from annular pocket 130. An abutment pin 136, having a head 138 and a stem 140 fixed in bore 142 of plate 108, is fixed on plate 108 in axial alignment with shaft 16 to limit outward axial displacement of axle shaft 16. Wheel disc 144 is mounted on flange 146 of wheel hub member 44 by stud and nut assemblies 148. Wheel rim assembly 150 is welded at 152 to wheel disc 144. Brake drum 154 of brake assembly 28 is fastened to shoulder 156 of wheel hub member 44 by bolts 158.

Referring to FIGURES 2 to 4, between bearings 30 and 40, wheel hub member 44 is formed with an annular oil retaining groove 160. An oil inlet cavity 162 is formed in wheel hub 44, being defined by side walls 164 and 165 and by outside and inside walls 166 and 167. Extended portions of side walls 164 and 165 are the sides in channel 168 of cavity 162 which extends radially inward to annular groove 160. Cacity 162 is provided with axially facing opening 170 which is framed by opening edges 172 and 174 respectively of side walls 164 and 165, by radially inward lip 176 and by radially outward lip 178. Lip 178 is of such a height that, when wheel hub member 44 is rotated so that opening 170 passes through the low portion of its rotational path of movement, oil flows from the surface of a pool of oil maintained in the lower portion of the chamber defined by hub 44, carrier 94 and plate 108 over lip 178 into basin 180 behind lip 178. Sidewalls 164 and 165 converge toward opening 170 to prevent escape of oil back through opening 170 as the cavity 162 is rotated upwardly from its bottom-most position through a position in horizontal relation with the shaft 16.

In operation when wheel member 44 is rotated and opening 170 passes through the uppermost portion of its path of movement, oil that entered basin 180 when the opening 170 was near its bottom dead center position flows by gravity through channel 168 and into annular groove 160. Channel 168 extends radially inward sufficiently far that channel end lips 186 and 188 (FIGURE 3) of side walls 164 and 165 respectively and channel end lips 190 and 192 limit return flow of oil from annular groove 160 back through channel 168 to basin 180 when cavity 162 again returns to its bottom dead center position. Annuar shoulder 194, which is a continuation of and of equal radius as channel lip 192 forms a radially extending wall for groove 160 adjacent bearing 40 retains sufficient oil in groove 160 at all times to assure oil flow over the inner edge of annular shoulder 195 to lubricate bearing 30 and additional oil flowing over the annular shoulder 194 into annular space 196 to lubricate bearing 40. In operation as the hub rotates a continuous flow of oil flows to the planetary pinion and wheel bearings, and the cavities adjacent the bearings store up oil sufficient for adequate starting lubrication.

Figure 8:
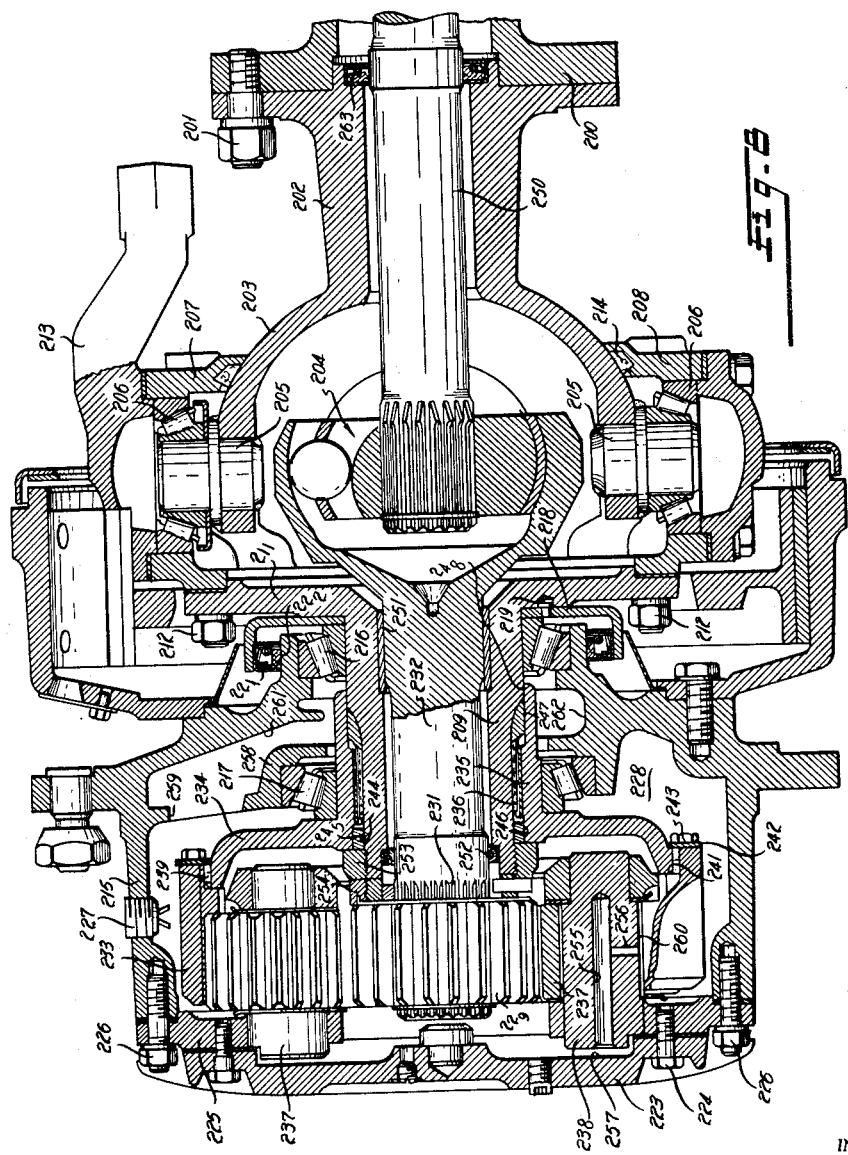
FIGURE 8 is a section through one end of a steer drive axle embodying the features of the invention.

FIGURE 8 shows the invention applied to a steer drive axle having a housing center section 200 to which is secured as by bolts 201 the housing extension 202 having an enlarged bell end 203 to accommodate the universal joint indicated at 204. Trunnion pins 205 are fixed in generally vertical axial alignment on housing 203 and externally thereof are surrounded by bearing assemblies 206 by which the yoke arms 207 and 208 of a hollow spindle 209 are journalled on the trunnions. Arms 207 and 208 are removably secured to integral spindle flange 211 as by stud assemblies 212. A tie rod 213 rigid with arm 207 is connected suitably to the vehicle steering linkage, so that rocking of the spindle 209 about the axis of trunnions 205 is effected by rod 213. A dust seal 214 is provided between each arm 207 and the adjacent surface of the housing bell 203.

In this embodiment the wheel hub 215 is journalled on the spindle by axially spaced tapered roller bearing assemblies 216 and 217. The inboard bearing 216 has its inner race rigid with the integral spindle flange 211, and an annular sheet meteal seal mounting plate 218 is secured to flange 211 as by rivets 219 and carries an annular oil seal 221 engaging the outer periphery of the inner end of the wheel hub at 222. The hub has its outer end closed by end plate 223 that is secured by bolts 224 to a planetary pinion carrier 225 which in turn is secured onto the hub by stud assemblies 226. An oil inlet and drain plug 227 is provided on the hub.

Within the space 228 enclosed by the hub is a planetary gear reduction system consisting essentially of a sun gear 229 mounted on splined section 231 of stub shaft 232, an internal ring gear 233 mounted on the rim of a mounting member 234 having its hub 235 splined to the spindle at 236, and a plurality of pinions 237 journalled on rigid pins 238 on the carrier 225 and meshed with both the sun and ring gears.

The sun gear 229 is mounted for radial float in the assembly. The ring gear 233 has a splined connection 239 to the rim of member 234 which also permits of radial float, and gear 233 is axially confined between the gear teeth ends at 241 and a plate 242 secured thereto by bolts 243.

At one end of the splined area at 236 of the spindle 209 is a hardened steel cylindrical ring 244 closely surrounding a cylindrical surface 245 on the spindle and having an external cylindrical periphery upon which snugly fits the internal cylindrical surface 246 of hub 235. At the other end of the splined area 236 the spindle is formed with a cylindrical surface 247 upon which snugly fits internal cylindrical surface 248 of hub 235. The surfaces 245–248 are preferably concentrically ground, and they assure a saddle mount of hub 235 over the splined area of the spindle which provides accurate alignment and results in substantially only torsion stress being transmitted by the splines at 236.

Stub shaft 232 is connected by the universal joint assembly at 204 to axle shaft 250 which at its other end is connected into the usual drive axle differential. Joint 204 is of any conventional structure. Internally of spindle 209 a sleeve bushing 251 and an axially spaced oil seal unit 252 are provided between the stub shaft and spindle. The hub 235 of ring gear mounting member 234 is axially held on the spindle by wheel bearing adjustment nut 253 threaded on the spindle end and a coacting lock washer assembly 254.

The planet pins 238 each have a central bore 255 open at the outer end and a connecting radial bore 256 to the bearing surfaces of the pinions on the pins. The inner surface of hub end plate 223 is formed with an annular pocket 257 in which oil collects during axle operation and out of which oil is directed into bores 255 to lubricate the pinion bearing surfaces. Preferably axial flow is aided by a flat area 260 machined on the surface of each pin. The lower part of the interior space 228 of hub 215 in FIGURE 8 is essentially an oil sump in which the ring and planet pinions are disposed, and during axle operation an essentially continuous flow of oil to the pinion bearings is attained.

The outboard wheel bearing has its inner race fixed on ring gear mount hub 235 and its outer race fixed on an internal wall 258 of the wheel hub. Wall 258 has an opening 259 to an internal guide passage 261 formed as at groove 262 to surround the spindle assembly. As the wheel hub rotates during vehicle axle operation oil is picked up from the sump to enter opening 259 and directed radially inwardly by passage 261 to annular groove 262 which distributes the oil axially to both wheel bearings 216 and 217. Thus a continuous flow of oil to the wheel bearings is assured during axle operation.

In the illustrated assembly the oil seal at 221 prevents escape of the lubricant for the planetary system and the oil seal 252 and bushing 251 act to effectively prevent oil from the interior of the hub from a mixing with the heavier lubricant in the universal joint space of the axle housing. The oil seal at 263 prevents mixing of the lubricant for the universal joint with the lubricant in the center section of the axle housing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. In a vehicle drive axle assembly, an axle housing having a wheel mounting spindle at its outer end, an axle shaft extending through said spindle and terminating outside the spindle end, a sun gear non-rotatably mounted on said shaft, a ring gear mounting member having a rim and a hub, an internal ring gear non-rotatably mounted on said rim by means that fixes the ring gear location axially but permits radial float of the ring gear on said rim, a splined connection between said hub and said spindle and axially spaced concentric snugly interfitting cylindrical surfaces on said spindle and the interior of said hub at opposite ends of said splined connection therebetween whereby said hub has a saddle mount on said spindle at said splined connection, a wheel hub rotatably mounted on said spindle, and a plurality of planet pinions rotatably mounted on said wheel hub in equally spaced relation circumferentially and each meshed with said sun and ring gears, said ring gear being sufficiently resiliently deformable to peripherally chord uniformly along its entire length during torque transmission whereby full tooth contact and uniform tooth loading exist between the planet and ring gears.

2. In the vehicle drive axle assembly defined in claim 1, means mounting said sun gear for radial float in the assembly.

3. In a vehicle drive axle assembly, an axle housing having a wheel mounting spindle at its outer end, an axle shaft extending through said spindle and terminating outside the spindle end, a sun gear non-rotatably mounted upon said shaft, a ring gear mounting member having a rim and a hub, an internal ring gear having a splined connection with said rim permitting radial float of said ring gear on said member, a splined connection between said hub and said spindle and concentric snugly interfitting cylindrical surfaces on said spindle and the interior of said hub at opposite ends of said splined connection therebetween whereby said hub has a saddle mount on said spindle, a wheel hub rotatably mounted on said spindle and a plurality of planet pinions rotatably mounted on said wheel hub in equally spaced relation circumferentially and each meshed with said sun and ring gears, said ring gear being sufficiently resiliently deformable to peripherally chord uniformly along its entire length during torque transmission whereby full tooth contact and uniform tooth loading exist between the planet and ring gears.

4. In a vehicle drive axle assembly, an axle housing having a wheel mounting spindle at its outer end, an axle shaft extending through said spindle and terminating outside the spindle end, a sun gear rotatable with said shaft and having radial float in the assembly, a ring gear mounting member having a rim and a hub, an internal ring gear having a splined connection with said rim permitting radial float of said ring gear on said member, a splined connection between said hub and said spindle and concentric snugly interfitting cylindrical surfaces on said spindle and the interior of said hub at opposite ends of said splined connection therebetween whereby said hub has a saddle mount on said spindle at said splined connection, a wheel hub rotatably mounted on said spindle and a plurality of planet pinions rotatably mounted on said wheel hub in equally spaced relation circumferentially and each meshed with said sun and ring gears, said ring gear being sufficiently resiliently deformable to peripherally chord uniformly along its entire length during torque transmission whereby full tooth contact and uniform tooth loading exist between the planet and ring gears.

5. In a vehicle steer drive axle assembly, an axle housing having a wheel mounting spindle pivotally mounted thereon, an axle shaft extending through said housing and spindle and terminating outside the spindle end, a sun gear non-rotatably mounted on said shaft, a ring gear mounting member having a rim and a hub, an internal ring gear having a splined connection with said rim permitting radial float of said ring gear on said member, a splined connection between said hub and said spindle and concentric snugly interfitting cylindrical surfaces on said spindle and the interior of said hub at opposite ends of said splined connection therebetween whereby said hub has a saddle mount on said spindle at said splined connection, a wheel hub rotatably mounted on said spindle and a plurality of planet pinions rotatably mounted on said wheel hub in equally spaced relation circumferentially and each meshed with said sun and ring gears, said ring gear being sufficiently resiliently deformable to peripherally chord uniformly along its entire length during torque transmission whereby full tooth contact and uniform tooth loading exist between the planet and ring gears.

6. In the steer drive axle assembly defined in claim 5, said spindle comprising a tubular section on which said ring gear mounting member hub is mounted and a radial flange connected by trunnions to said axle housing, and axially spaced wheel bearings on said ring gear mounting member hub and the tubular section of the spindle adjacent said flange for rotatably mounting the wheel hub on the spindle.

7. In a vehicle drive axle assembly, an axle housing having a wheel mounting spindle at its outer end, an axle shaft extending through the spindle and terminating outside the end of the spindle, a sun gear non-rotatably mounted on said axle shaft, a longitudinally extended external spline section on said spindle adjacent its outer end, a collar closely surrounding said spindle at its outer end axially outwardly of the splines and having a cylindrical external surface, a cylindrical surface on said spindle axially inwardly of said splines, a ring gear mounting member having a rim and a hub, an internal ring gear non-rotatably mounted on said rim, said ring gear being mounted for limited radial float on said rim, internal splines in said hub and concentric cylindrical surfaces within said hub at opposite ends of the splines fitting snugly over the respective cylindrical surfaces on the spindle and collar whereby said hub has a saddle mount on said spindle across said splined connection, a wheel hub rotatably mounted on said spindle, and a plurality of planet pinions rotatably mounted on the wheel hub in equally spaced relation circumferentially and each meshed with said sun and ring gears, said ring gear being sufficiently resiliently deformable to peripherally chord uniformly along its entire length during torque transmission whereby full tooth contact and uniform tooth loading exist between the planet and ring gears.

8. An axle outer end planetary gear mechanism for a vehicle drive axle comprising an axle housing mounted hollow wheel spindle, an axle shaft extending through said spindle and an axle shaft mounted sun gear at the outer end of said spindle, a ring gear coaxial with said sun gear, a plurality of uniformly circumferentially distributed external splines on said spindle, means providing axially spaced concentric continuously cylindrical external surfaces on said spindle at opposite ends of said splines, a mounting member supporting said ring gear on said spindle and having a hub surrounding and internally splined for mating with said spindle splines, means providing axially spaced concentric continuously cylindrical internal surfaces within said hub closely surrounding said cylindrical surfaces of the spindle, means mounting said ring gear on said mounting member in substantially axially fixed position but so as to permit limited radial float of said ring gear on said member, a wheel hub connected planetary gear carrier mounted for rotation coaxial with said sun and ring gears, and a plurality of planetary pinions rotatably mounted on said carrier in equally spaced relation circumferentially in constant mesh with said sun and ring gears, said ring gear being sufficiently resiliently deformable to peripherally chord uniformly along its entire length during torque transmission whereby full tooth contact and uniform tooth loading exist between the planet and ring gears.

9. An axle outer end planetary gear mechanism for a vehicle drive axle comprising an axle housing mounted hollow wheel spindle, an axle shaft extending through said spindle and an axle shaft mounted sun gear at the outer end of said spindle, a ring gear coaxial with said sun gear, a plurality of uniformly circumferentially distributed external splines on said spindle, means providing axially spaced concentric continuously cylindrical external surfaces on said spindle at opposite ends of said splines, a mounting member supporting said ring gear on said spindle and having a hub surrounding and internally splined for mating with said spinddle splines, means providing axially spaced concentric continuously cylindrical internal surfaces within said hub closely surrounding said cylindrical surfaces of the spindle, means mounting said ring gear on said mounting member in substantially axially fixed position but so as to permit limited radial float of said ring gear on said member, a wheel hub connected planetary gear carrier mounted for rotation coaxial with said sun and ring gears, a plurality of planetary pinions rotatably mounted on said carrier in equally spaced relation circumferentially in constant mesh with said sun and ring gears, said ring gear being sufficiently resiliently deformable to peripherally chord uniformly along its entire length during torque transmission whereby full tooth contact and uniform tooth loading exist between the planet and ring gears, axially spaced bearing assemblies supporting said wheel hub, one of said bearing assemblies being located directly between the wheel hub and the spindle, and the other bearing assembly being mounted between the wheel hub and the hub of the ring gear mounting member and being located axially between said cylindrical surfaces.

10. In a vehicle drive axle assembly, an axle housing having a wheel mounting spindle at its outer end, an axle shaft extending through the spindle and terminating outside the end of the spindle, a sun gear non-rotatably mounted on said axle shaft, a ring gear mounting member having a rim and a hub, an internal ring gear non-rotatably mounted on said rim and for radial float on said rim, means non-rotatably mounting said hub on said spindle, a wheel hub rotatably mounted on said spindle, and a plurality of planet pinions rotatably mounted on the wheel hub in equally spaced relation circumferentially and each meshed with said sun and ring gears, said ring gear being sufficiently resiliently deformable to peripherally chord uniformly along its entire length during torque transmission whereby full tooth contact and uniform tooth loading exist between the planet and ring gears.

11. In a vehicle drive axle assembly, an axle housing having a wheel mounting spindle at its outer end, an axle shaft extending through said spindle and terminating outside the spindle end, a sun gear non-rotatably mounted on said shaft, a ring gear mounting member having a rim and a hub, an internal ring gear having a splined connection with said rim permitting radial float of said ring gear on said member, a non-rotatable mounting connection between said hub and said spindle, a wheel hub rotatably mounted on said spindle and a plurality of planet pinions rotatably mounted on said wheel hub in equally spaced relation circumferentially and each meshed with said sun and ring gears, said ring gear being sufficiently resiliently deformable to peripherally chord uniformly along its entire length during torque transmission whereby full tooth contact and uniform tooth loading exist between the planet and ring gears.

12. In a vehicle drive axle assembly, an axle housing having a wheel mounting spindle at its outer end, an axle shaft extending through the spindle and terminating outside the end of the spindle, a radially floating sun gear non-rotatably mounted on said axle shaft, a ring gear mounting member comprising a hub non-rotatably mounted on said spindle and a rim, an internal ring gear non-rotatably mounted on said rim and for radial float on said rim, a wheel hub rotatably mounted on said spindle, and a plurality of planet pinions rotatably mounted on said wheel hub in equally spaced relation circumferentially and each meshed with said sun and ring gears, said ring gear being sufficiently resiliently deformable to peripherally chord uniformly along its entire length during torque transmission whereby full tooth contact and uniform tooth loading exist between the planet and ring gears.

13. In an outer end planetary vehicle drive axle the combination comprising a non-rotatable spindle, an axle drive shaft extending through said spindle having a sun gear mounted on its end for radial float, a plurality of planetary pinions meshing with said sun gear and mounted in equally spaced relation circumferentially for rotation on a wheel hub surrounding said spindle, and a stationary internal ring gear mounted for radial float on said spindle and meshing with all of said pinions, said ring gear being sufficiently deformable to peripherally chord uniformly along its length during torque transmission and said radially floating sun gear and said radially floating ring gear coacting to provide equal tooth loading and equal tooth contact and to equalize tooth pressure among the intermeshing gears.

14. In a vehicle drive axle assembly characterized by an axle housing having a wheel mounting spindle at its outer end and an axle shaft extending through the spindle and terminating outside the end of the spindle, the drive improvement comprising a sun gear non-rotatably mounted on said axle shaft, a ring gear mounting member having a rim and a hub, a laterally confined internal ring gear non-rotatably mounted on said rim and for radial float on said rim, means non-rotatably mounting said hub on said spindle, a wheel hub rotatably mounted on said spindle, and three planet pinions rotatably mounted on the wheel hub in equally spaced circumferential relation and each meshed with said sun and ring gears, said ring gear being sufficiently resiliently deformable to arcuate triangulate shape peripherally along its entire length during torque transmission whereby full tooth contact and uniform tooth loading exist between the ring and planet gears.

15. In a vehicle drive axle assembly characterized by an axle housing having a wheel mounting spindle at its outer end and an axle shaft extending through said spindle and terminating outside the spindle end, the drive improvement comprising a sun gear non-rotatably mounted on said shaft, a ring gear mounting member having a rim and a hub, an internal ring gear non-rotatably mounted on said rim by means that fixes the ring gear locating axially but permits radial float of the ring gear on said rim, a splined connection between said hub and said spindle and axially spaced concentric snugly interfitting cylindrical surfaces on said spindle and the interior of said hub at opposite ends of said splined connection therebetween whereby said hub has a saddle mount on said spindle at said splined connection, a wheel hub rotatably mounted on said wheel hub in equally spaced circumferential relation and each meshed with said sun and ring gears, said ring gear being sufficiently resiliently deformable to arcuate triangulate shape peripherally along its entire length during torque transmission whereby full tooth contact and uniform tooth loading exist between the ring and the planet gears.

References Cited in the file of this patent

UNITED STATES PATENTS

| | | |
|---|---|---|
| 1,464,887 | Starr | Aug. 14, 1923 |
| 2,424,578 | Mortag | July 29, 1947 |
| 2,703,021 | Stoeckicht | Mar. 1, 1955 |
| 2,801,702 | Armington | Aug. 6, 1957 |
| 3,043,155 | Salna | July 10, 1962 |

FOREIGN PATENTS

| | | |
|---|---|---|
| 890,697 | France | Feb. 15, 1944 |